United States Patent
Kawasaki (10) Patent No.: US 9,930,208 B2
(45) Date of Patent: Mar. 27, 2018

(54) PRINTING APPARATUS CAPABLE OF PERFORMING DIRECT WIRELESS COMMUNICATION, METHOD OF CONTROLLING DIRECT WIRELESS COMMUNICATION OF THE PRINTING APPARATUS, AND STORAGE MEDIUM

(71) Applicant: CANON KABUSHIKI KAISHA, Tokyo (JP)

(72) Inventor: Hiroki Kawasaki, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/413,191

(22) Filed: Jan. 23, 2017

(65) Prior Publication Data
US 2017/0223219 A1 Aug. 3, 2017

(30) Foreign Application Priority Data
Feb. 3, 2016 (JP) ................................ 2016-019251

(51) Int. Cl.
| | |
|---|---|
| G06F 15/00 | (2006.01) |
| G06F 3/12 | (2006.01) |
| G06K 1/00 | (2006.01) |
| H04N 1/32 | (2006.01) |
| H04W 76/02 | (2009.01) |
| H04L 12/741 | (2013.01) |
| H04N 1/327 | (2006.01) |

(52) U.S. Cl.
CPC ....... *H04N 1/32587* (2013.01); *H04L 45/745* (2013.01); *H04N 1/32566* (2013.01); *H04N 1/32767* (2013.01); *H04W 76/023* (2013.01); *H04N 2201/0041* (2013.01); *H04N 2201/0055* (2013.01); *H04N 2201/0094* (2013.01); *H04N 2201/3278* (2013.01)

(58) Field of Classification Search
CPC .......... H04N 1/32587; H04N 1/32566; H04N 1/32767; H04N 2201/0041; H04N 2201/0055; H04N 2201/0094; H04N 2201/3278; H04L 45/745; H04W 76/023
USPC ............................... 358/1.15, 1.13, 1.1, 1.14
See application file for complete search history.

(56) References Cited

U.S. PATENT DOCUMENTS

| | | | |
|---|---|---|---|
| 8,976,391 B2 | 3/2015 | Nanaumi | |
| 2015/0050880 A1* | 2/2015 | Choi | H04W 76/02 455/39 |
| 2015/0052221 A1* | 2/2015 | Yoon | H04W 4/008 709/217 |

FOREIGN PATENT DOCUMENTS

JP 2013-205982 A 10/2013

* cited by examiner

*Primary Examiner* — Douglas Tran
(74) *Attorney, Agent, or Firm* — Fitzpatrick, Cella, Harper & Scinto (57) ABSTRACT

A printing apparatus equipped with a direct wireless communication function, and a method of controlling the same, set, in accordance with an instruction of a user, a service to enable in the direct wireless communication function from among a plurality of services including a print service, and control the printing apparatus to execute the direct wireless communication function, applying a port filter corresponding to the service that is set.

8 Claims, 10 Drawing Sheets

| PORT NUMBER | RECEIVE/SEND | TCP/UDP | |
|---|---|---|---|
| 1. 9100 | RECEIVE | TCP | EDIT |
| 2. 515 | RECEIVE | TCP | EDIT |
| 3. 161 | SEND AND RECEIVE | UDP | EDIT |
| 4. 67 | SEND | UDP | EDIT |
| 5. | | | EDIT |

FILTER LIST OF PORT FOR DIRECT WIRELESS COMMUNICATION

BACK    OK

LAN CONNECTION COMMUNICATION PORT FILTER LIST

| | PORT NUMBER | RECEIVE/ SEND | TCP/UDP | |
|---|---|---|---|---|
| 1. | 9100 | RECEIVE | TCP | EDIT |
| 2. | 515 | RECEIVE | TCP | EDIT |
| 3. | 161 | SEND AND RECEIVE | UDP | EDIT |
| 4. | 67 | SEND | UDP | EDIT |
| 5. | | | | EDIT |

BACK  OK

PRINTING APPARATUS CAPABLE OF PERFORMING DIRECT WIRELESS COMMUNICATION, METHOD OF CONTROLLING DIRECT WIRELESS COMMUNICATION OF THE PRINTING APPARATUS, AND STORAGE MEDIUM

BACKGROUND OF THE INVENTION

Field of the Invention

The present invention relates to a printing apparatus, a method of controlling the same, and a storage medium.

Description of the Related Art

Printing apparatuses such as multi function peripherals and printers in which a wireless LAN function is equipped are increasing in number. Printing apparatuses equipped with the wireless LAN function receive printing data from an external apparatus such as a PC or a mobile terminal via an access point and execute print processing based on the received printing data. Here, a network to which the printing apparatus is connected is often protected from a security perspective such that a terminal that a network manager did not give permission cannot connect.

Also, there are printing apparatuses that perform direct wireless communication with external apparatuses without going through a relay apparatus such as an access point. In Japanese Patent Laid-Open No. 2013-205982, a printing apparatus that performs direct wireless communication with a mobile terminal using Wi-Fi Direct is disclosed.

In the case of such direct wireless communication, a user first selects a Wi-Fi Direct start button on an operation panel of the printing apparatus to start processing for the direct wireless communication. Then, by the user operating a connection button of the operation panel of the mobile terminal, a connection request is transmitted from the mobile terminal to the printing apparatus, and a direct wireless connection is established.

In this way, while convenience for the user of the mobile terminal is improved by the printing apparatus and the mobile terminal performing direct wireless communication, there is the risk that the printing apparatus will be connected to by a terminal that the network manager has not permitted since the communication does not go through a relay apparatus. There is the presupposition that the printing apparatus will be used after being connected to a network in which security is guaranteed. Accordingly, in the case of direct wireless communication, there is the risk that a malicious user will access the printing apparatus wirelessly, and will steal important data from the printing apparatus, or will carry out a cyber-attack on the printing apparatus.

SUMMARY OF THE INVENTION

An aspect of the present invention is to eliminate the above-mentioned problems which are found in the conventional technology.

A feature of the present invention is to provide a technique for guaranteeing security for a printing apparatus that communicates by a direct wireless communication function.

According to a first aspect of the present invention, there is provided a printing apparatus equipped with a direct wireless communication function, the apparatus comprising: at least one processor; and at least one memory having instructions stored thereon which, when executed by the at least one processor, cause the printing apparatus to: set, in accordance with an instruction of a user, a service to enable in the direct wireless communication function from among a plurality of services including a print service; and control the printing apparatus to execute the direct wireless communication function, applying a port filter corresponding to the set service, wherein the port filter does not affect communication of a wired LAN interface.

According to a second aspect of the present invention, there is provided a printing apparatus, comprising: at least one processor; and at least one memory having instructions stored thereon which, when executed by the at least one processor, cause the printing apparatus to: perform direct wireless communication with an external apparatus; set whether or not to enable a port filter in the direct wireless communication; and control to perform direct wireless communication in accordance with the port filter set for a port used in the direct wireless communication function in a case that the port filter is set to be enabled.

According to a third aspect of the present invention, there is provided a method of controlling a printing apparatus equipped with a direct wireless communication function, the method comprising: setting, in accordance with an instruction of a user, a service to enable in the direct wireless communication function from among a plurality of services including a print service; and controlling the printing apparatus to execute the direct wireless communication function, applying a port filter corresponding to the service that is set, wherein the port filter does not affect communication of a wired LAN interface.

According to a fourth aspect of the present invention, there is provided a method of controlling a printing apparatus equipped with a direct wireless communication function, the method comprising: setting whether or not to enable a port filter in the direct wireless communication; and controlling to perform direct wireless communication in accordance with the port filter, which is set for a port used in the direct wireless communication function, when the port filter is set to be enabled.

According to a fifth aspect of the present invention, there is provided a non-transitory computer-readable storage medium storing a program for causing a processor to execute a method of controlling a printing apparatus equipped with a direct wireless communication function, the method comprising: setting, in accordance with an instruction of a user, a service to enable in the direct wireless communication function from among a plurality of services including a print service; and controlling the printing apparatus to execute the direct wireless communication function, applying a port filter corresponding to the service that is set, wherein the port filter does not affect communication of a wired LAN interface.

According to a sixth aspect of the present invention, there is provided a non-transitory computer-readable storage medium storing a program for causing a processor to execute a method of controlling a printing apparatus equipped with a direct wireless communication function, the method comprising: setting whether or not to enable a port filter in the direct wireless communication; and controlling to perform direct wireless communication in accordance with the port filter, which is set for a port used in the direct wireless communication function, when the port filter is set to be enabled.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Figure 1:
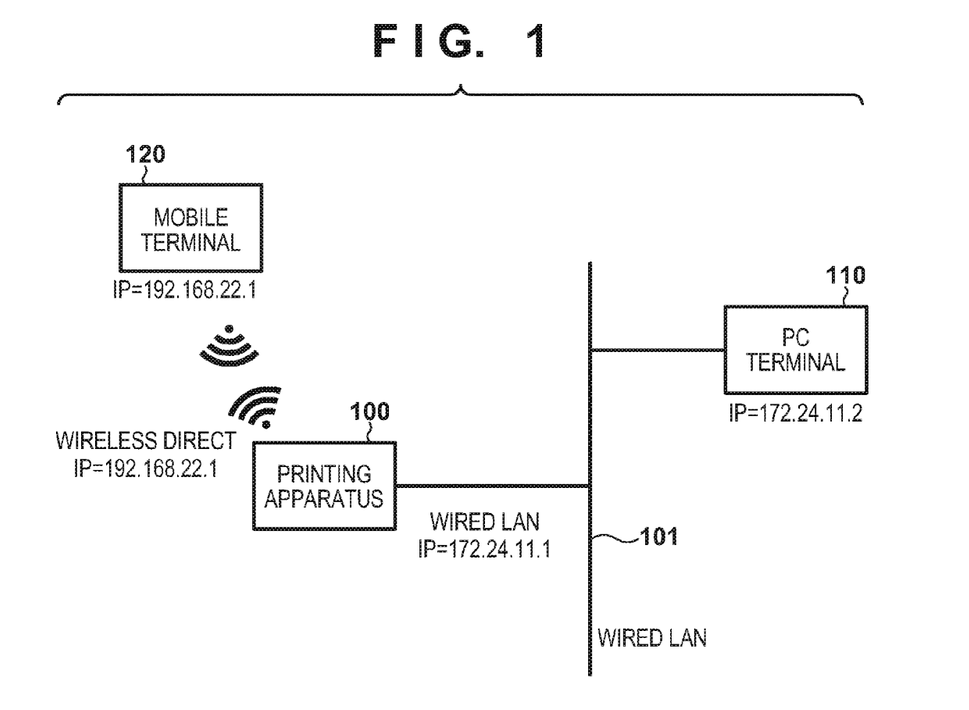
FIG. 1 depicts a view for describing a configuration of a communication system according to a first embodiment of the present invention.

FIG. 1 depicts a view for describing a configuration of a communication system according to a first embodiment of the present invention.

A printing apparatus 100 has two or more network interfaces, and mounts a multi-home function that operates in parallel to the printing apparatus 100. The printing apparatus 100 is connected to a PC terminal 110 via a wired LAN 101, and in this embodiment, the printing apparatus 100 uses a wired LAN interface IP address "172. 24. 11. 1". Also, the printing apparatus 100 is equipped with adirect wireless communication function for performing direct wireless communication to a mobile terminal (a communication terminal) 120 without going through a relay apparatus, such as an access point. In this direct wireless communication, the IP address "192. 168. 22. 1" of a direct wireless interface is used. In such a case, the printing apparatus 100 becomes the access point of the wireless communication and receives a connection request from the mobile terminal 120, and the mobile terminal 120, as a client, transmits the connection request to the printing apparatus 100 to establish the direct wireless communication. Also, in FIG. 1, the IP addresses given to the PC terminal 110 and the mobile terminal 120 indicate the IP addresses of the printing apparatus 100 which the PC terminal 110 and the mobile terminal 120 recognize, respectively.

Figure 2:
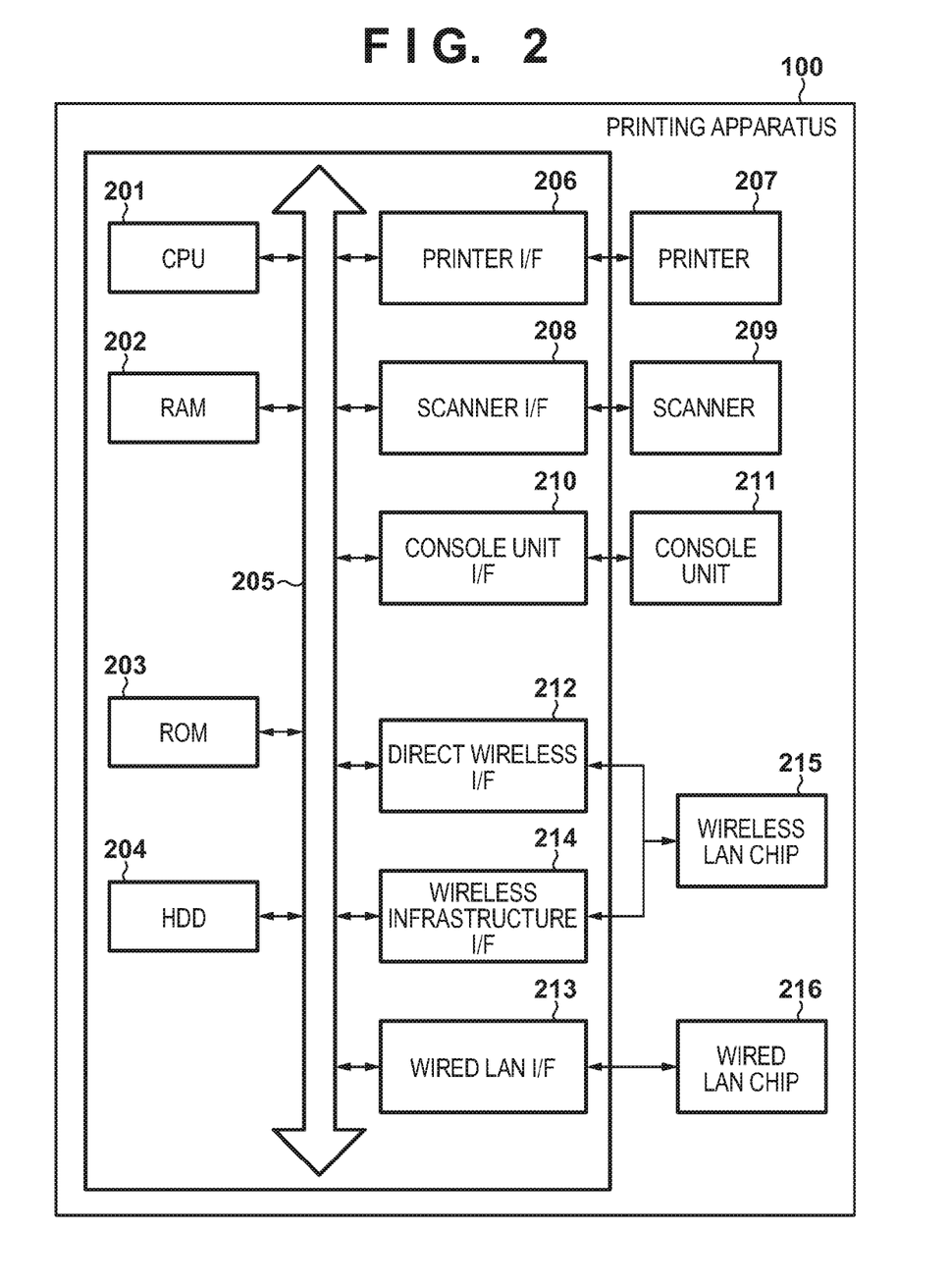
FIG. 2 is a block diagram for describing a hardware configuration of a printing apparatus according to the first embodiment.

FIG. 2 is a block diagram for describing a hardware configuration of the printing apparatus 100 according to the first embodiment. For the printing apparatus 100 according to the first embodiment, a multi function peripheral (Multi-Function Peripheral) equipped with a scanner function is envisioned, but it may also be a printer that is not equipped with a scanner function.

A CPU 201 controls operation of the printing apparatus 100 by controlling each unit, connected via a bus 205, by deploying and executing a control program stored in a ROM 203 to a RAM 202. The ROM 203 stores control programs and various data. The RAM 202 is used as a temporary storage area, such as a work area and a main memory of the CPU 201. An HDD 204 stores various data, such as printing data and scanned images.

Also, in the printing apparatus 100, the single CPU 201 is assumed to perform each process described in flowcharts described later, but another configuration may be taken. For example, it is possible for a plurality of CPUs to cooperate so as to execute each process illustrated in the flowcharts described later.

A printer 207 is connected to the bus 205 via a printer interface 206, and prints images on sheets (paper) based on printing data received from the external apparatus and image data generated by a scanner 209. The scanner 209 is connected to the bus 205 via a scanner interface 208, and generates scanned image data (read image data) by reading an original. The image data generated by the scanner 209 is printed by the printer 207, or is stored in the HDD 204.

A console unit 211 is connected to the bus 205 via a console unit interface 210, and is equipped with a display unit comprising a touch panel function and a keyboard, and displays each kind of the screen described later. A user can input various instructions and information to the printing apparatus 100 via the console unit 211. A wireless LAN chip 215 realizes communication with an external apparatus by wireless LAN communication, and comprises wireless infrastructure and the direct wireless connection types as wireless LAN connection types. A direct wireless interface unit 212 performs direct wireless communication with external apparatuses such as the mobile terminal 120 via the wireless LAN chip 215. A wireless infrastructure interface unit 214 performs wireless LAN communication with external apparatuses such as an access point via the wireless LAN chip 215. A wired LAN interface unit 213 performs communication by the wired LAN via a wired LAN chip 216 with external apparatuses such as the PC terminal 110.

Figure 3:
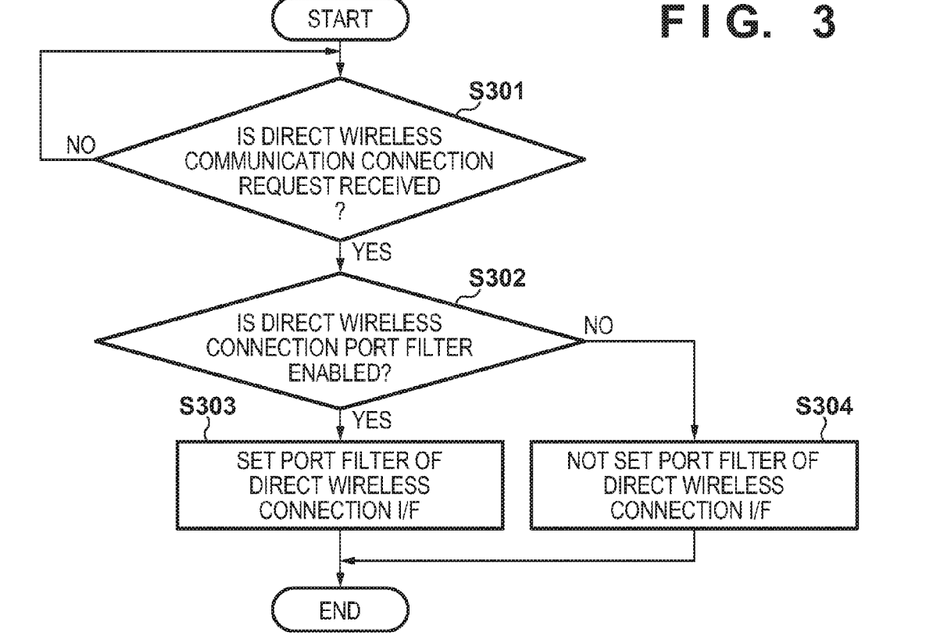
FIG. 3 is a flowchart for describing control processing when the printing apparatus according to the first embodiment performs direct wireless communication.

Next, the control processing for when the printing apparatus 100 performs the direct wireless communication is explained by using the flowchart of FIG. 3.

FIG. 3 is a flowchart for describing control processing when the printing apparatus 100 according to the first embodiment performs direct wireless communication. Also, each step described in this flowchart is realized by the CPU 201 deploying and executing a control program stored in a memory such as the ROM 203 or the RAM 202.

Firstly, in step S301 when the CPU 201 determines that a request to start a direct wireless connection is received from an external terminal such as the mobile terminal 120 for example, the processing proceeds to step S302. In step S302 the CPU 201 determines whether or not a direct wireless connection port filter setting that is set in the printing apparatus 100 is enabled. Here whether or not the direct connection port filter setting is enabled is determined by referencing a value (stored in the RAM 202) set via a UI screen illustrated in FIG. 4, for example.

Figure 4:
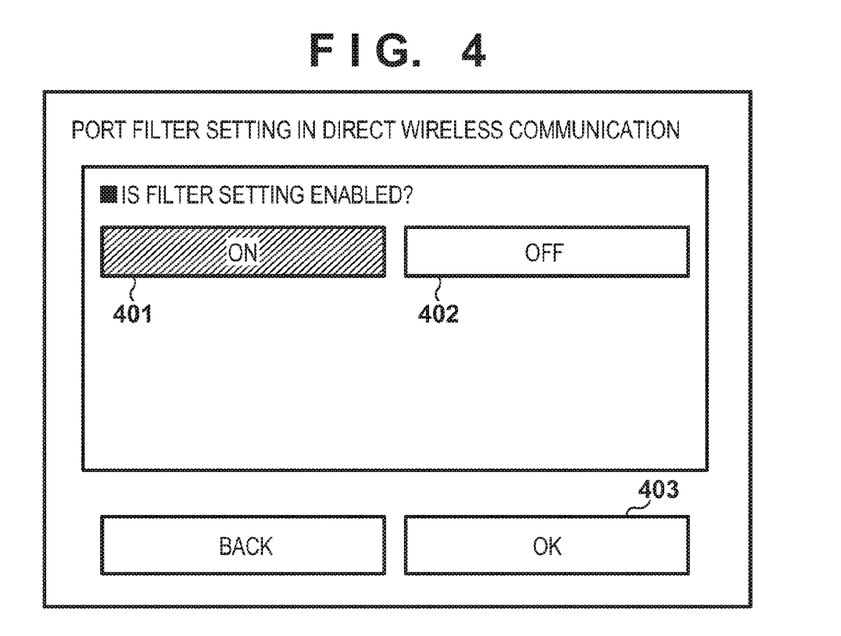
FIG. 4 depicts a view illustrating an example of a UI screen which is displayed in a console unit of the printing apparatus according to the first embodiment, and on which a filter is set with respect to a port for direct wireless communication.

FIG. 4 depicts a view illustrating an example of a UI screen which is displayed on the console unit 211 of the printing apparatus 100 according to the first embodiment, and on which a filter is set with respect to a port for direct wireless connection.

A user selects an "ON" button 401 or an "OFF" button 402 on this screen and then presses an OK button 403. By this, the CPU 201 stores in the RAM 202 a value (ON or OFF) indicating whether to make the filter setting of a set port enabled or disabled. Here, when the "ON" button 401 is selected and the value (ON) is stored, it is determined whether the filter setting of the port in the direct wireless communication is enabled. FIG. 4 illustrates a state in which the "ON" button 401 is selected.

In step S302, the processing proceeds to step S304 when it determines that the direct wireless connection port filter setting is disabled (OFF), and the CPU 201 causes communication to be allowed from various port numbers without applying the port filtering function to the direct wireless I/F unit 212. Meanwhile, the processing proceeds to step S303 when it is determined in step S302 that the direct wireless connection port filter setting is enabled (ON). In step S303, the CPU 201 applies a port filtering function to the direct wireless I/F unit 212 and executes a filtering operation on a communication port set in advance at a time of a direct wireless connection. That is, it does not permit direct wireless communication via a communication port for which a filter is set. This filter does not act on interfaces other than the direct wireless connection interface, and does not affect communication via a wired LAN interface for example.

Figure 11:
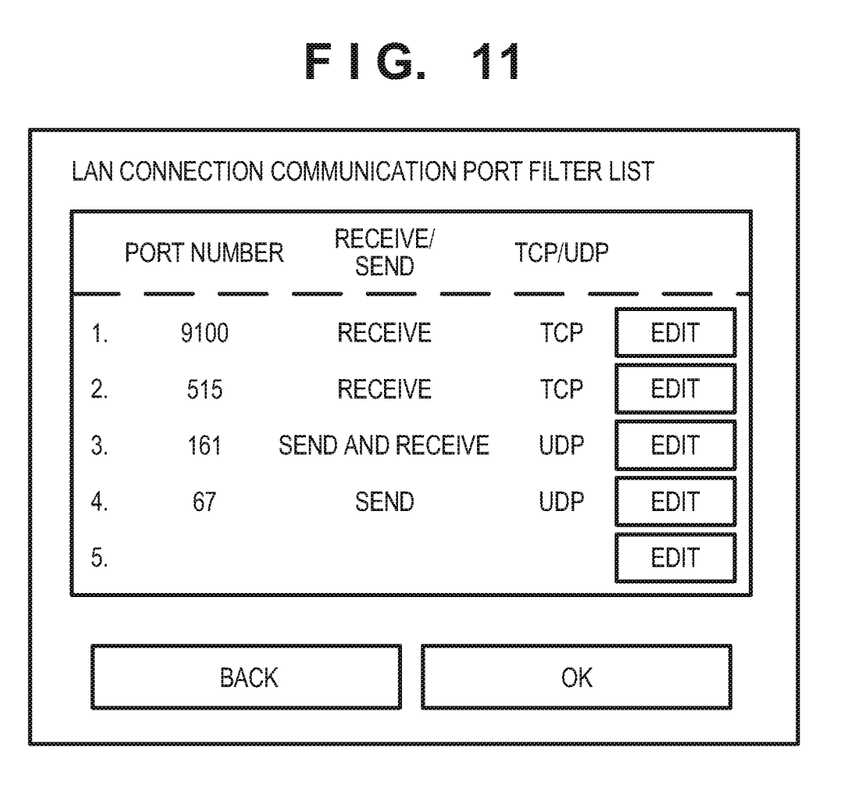
FIG. 11 depicts a view illustrating an example of a UI screen on which settings of filters on port numbers that are used in an interface for a local area network (LAN), which are set in the printing apparatus according to the embodiments, are performed.

For this reason, the port number for LAN connection illustrated in FIG. 11, for example, is not affected by this port filter setting. Also, the restricted communication port is not something that the user can set, but rather is a port number that is set in the printing apparatus 100 in advance.

As a concrete example, assume that the direct wireless connection interface name is "wlan0" and the wired LAN interface name is "eth0". Here, it is assumed that, as a port filter, a particular port number, for example "9100" only, is set to "ACCEPT" in relation to communication data that is received or transmitted with the interface name "wlan0". In such a case, only data of the port number "9100" is received, and other data is discarded. However, with respect to communication data received or transmitted on the wired LAN interface "eth0", filtering processing is not performed even with data other than that of the port number "9100".

By this, the printing apparatus 100 can be made to not be able to transmit/receive data other than by the permitted port number in a case where transmission/reception of data is performed by the direct wireless connection interface.

Figure 5A:
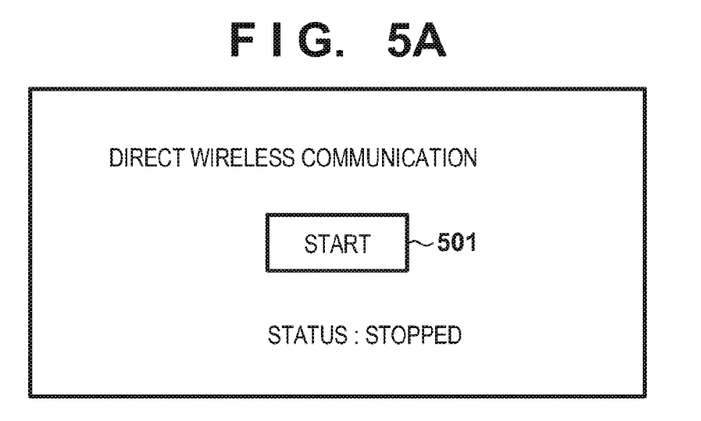
FIGS. 5A to 5C depict views respectively illustrating examples of UI screens for causing the printing apparatus according to the first embodiment to start or stop direct wireless communication.
Figure 5B:
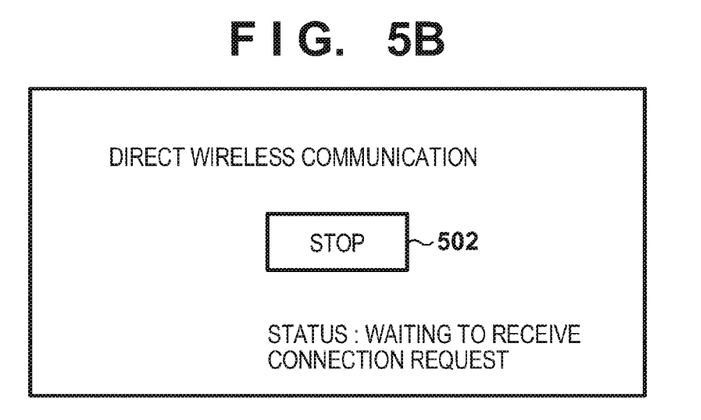
Figure 5C:
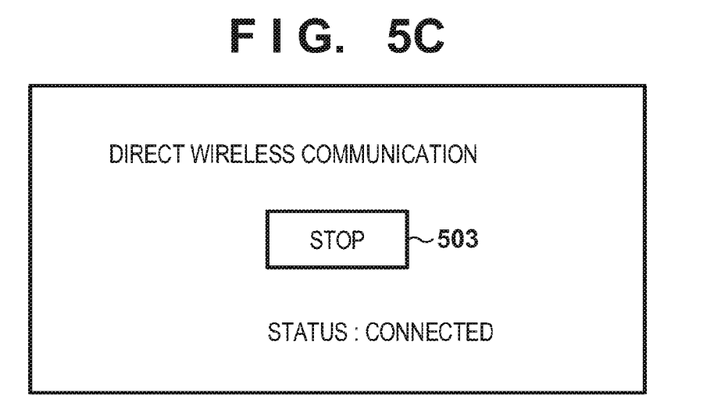

FIGS. 5A to 5C depict views respectively illustrating examples of UI screens for causing the printing apparatus 100 according to the first embodiment to start or stop direct wireless communication. These UI screens are displayed on the console unit 211.

FIG. 5A depicts a view illustrating an example of a default screen, and the state of direct wireless communication is "STOPPED" and is a state in which the printing apparatus 100 awaits a user pressing a start button 501 for instructing to start direct wireless communication.

When the user presses the start button 501 in the screen of FIG. 5A, transition is made to the screen illustrated in FIG. 5B. Here, the state of the direct wireless communication is "WAITING TO RECEIVE CONNECTION REQUEST" and is a state in which the printing apparatus 100 awaits reception of a connection request from the mobile terminal 120. When the user presses a stop button 502 here, the UI screen returns to the screen of FIG. 5A.

FIG. 5C depicts a view illustrating an example of a screen of a state in which the mobile terminal 120 and the printing apparatus 100 are connected directly and wirelessly. Here, the state of the direct wireless communication is "CONNECTED". When the user presses a stop button 503 or a request to disconnect is received from the mobile terminal 120 in the "CONNECTED" state, the UI screen returns to the screen illustrated in FIG. 5A.

FIG. 11 depicts a view illustrating an example of a UI screen on which settings of filters on port numbers that are used in an interface for a local area network (LAN), which are set in the printing apparatus 100 according to the embodiment, are performed.

In the filter setting here, it is possible to make the setting designating the port number, send/receive, and TCP/UDP. The user can set the permission or rejection of send/receive with respect to a particular port number on this filter list setting screen. In FIG. 11, reception and communication in the protocol "TCP" are set to be prohibited for the port number "9100", for example. In FIG. 11, it is made to be possible to set filters with respect to five port numbers, but there may be more than this. Also, for port numbers, configuration may also be taken such that it is possible to designate a range of port numbers such as "10-200" for example.

Also, it is possible to perform setting of a filter with respect to each port using a UI screen as in later described FIG. 9.

By the first embodiment as described above, it is possible to perform a filter setting with respect to a port number used in direct wireless communication, and to enable or disable this filter setting. By this, it is possible to use only a port of a desired port number to perform direct wireless communication.

[Second Embodiment]

Next, a second embodiment of the present invention will be described. In the second embodiment, an example in which services that can be used in direct wireless communication are defined using port filters in the printing apparatus 100 is described. Note that since the system configuration and the configurations of the printing apparatus 100, the PC terminal 110, and the mobile terminal 120 according to the second embodiment are similar to those of the previously described first embodiment, description thereof is omitted.

Figure 6:
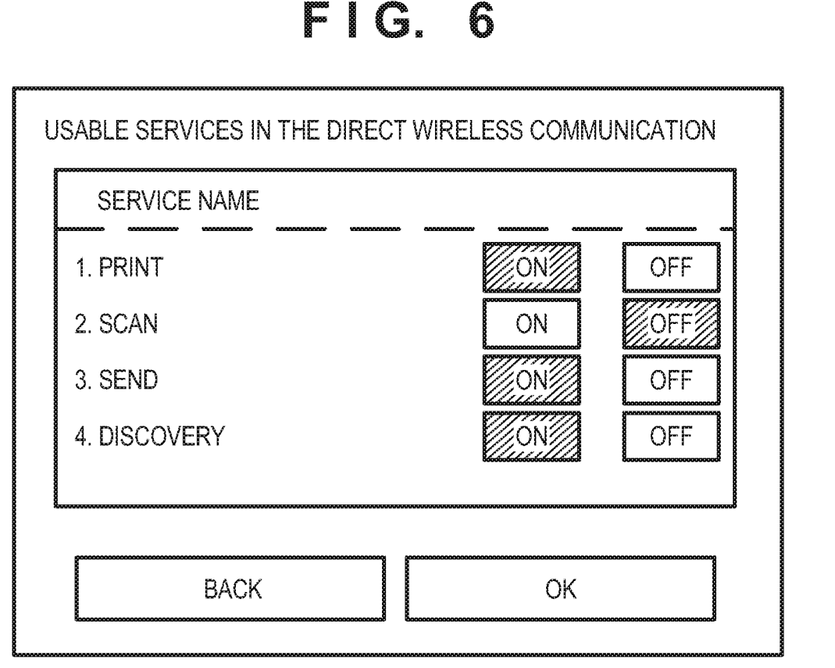
FIG. 6 depicts a view illustrating an example of a screen which is displayed on the console unit of the printing apparatus according to a second embodiment, and on which services that can be used in a direct wireless communication service are set.

FIG. 6 depicts a view illustrating an example of a screen which is displayed in the console unit 211 of the printing apparatus 100 according to the second embodiment, and on which services that can be used in a direct wireless communication service are set.

The screen includes a service name, and ON and OFF switches by which these services are set to be enabled/disabled. For example, in a PRINT service, it is possible to set a print service to be enabled/disabled in one batch in relation to port numbers of the protocol used in the print function, for example "9100", "515", and "631". Also, in a SCAN service, it is possible to set a scan service to enabled/disabled in one batch in relation to port numbers of the protocol used in the scanner function of the printing apparatus 100, for example "67" and "443". Also, in a SEND service, it is possible to set a send service to enabled/disabled in one batch in relation to port numbers used in a file transmission function of the printing apparatus 100, for example "80" and "443". Also, in a DISCOVERY service, it is possible to set a discovery service to enabled/disabled in one batch in relation to port numbers of the protocol used to discover the printing apparatus 100, for example "5353" and "9013".

In the example of FIG. 6, the print (PRINT) service is set to ON, the scan (SCAN) service is set to OFF, the transmission (SEND) service is set to ON, and the discovery (DISCOVERY) service is set to ON. It is possible to set each service that can be used in direct wireless communication by pressing the OK button after these settings are performed.

Figure 7:
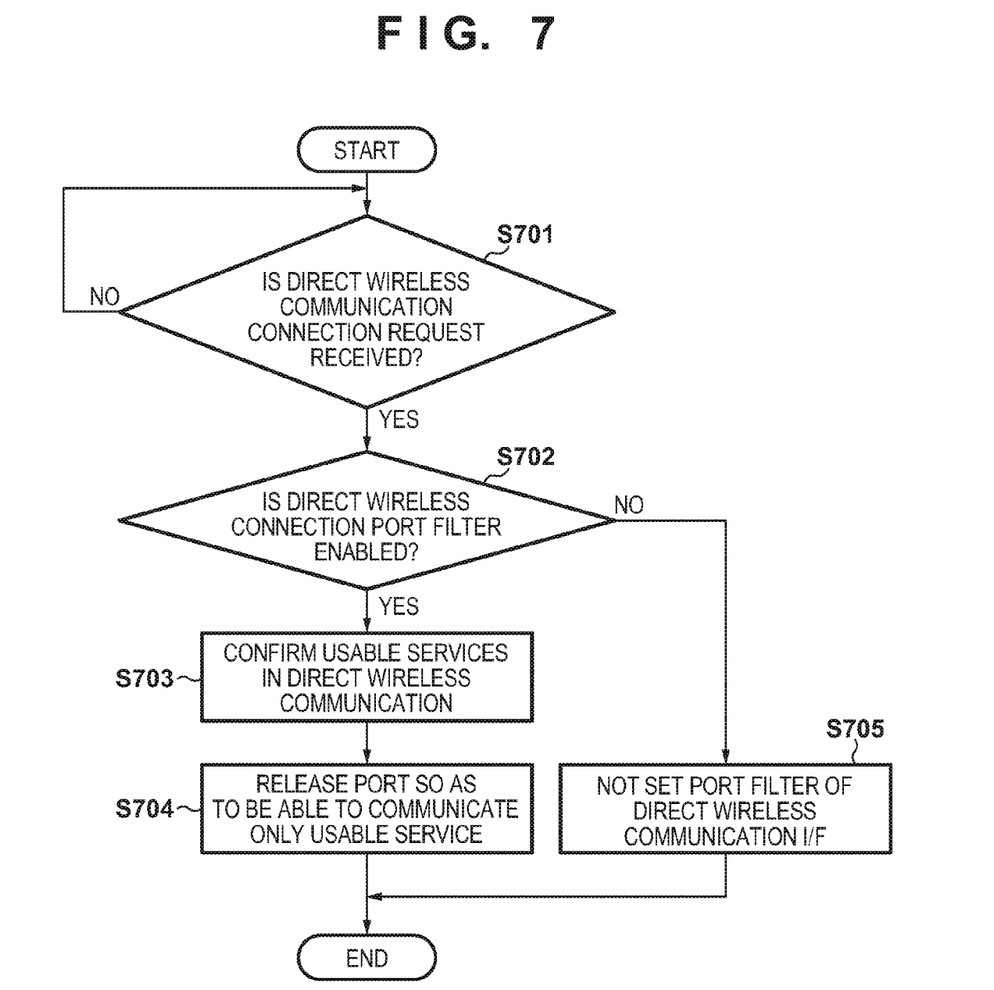
FIG. 7 is a flowchart for describing processing in which the printing apparatus according to the second embodiment uses a service by direct wireless communication.

FIG. 7 is a flowchart for describing processing in which the printing apparatus 100 according to the second embodiment uses a service by direct wireless communication. Also, each step described in this flowchart is realized by the CPU 201 deploying a control program stored in a memory such as the ROM 203 to the RAM 202 and executing it. Note that in FIG. 7, the processing of step S701-step S702 and step S705 is the same as step S301, step S302, and step S304 of FIG. 3 according to the previously described first embodiment, and description thereof is omitted.

In step S703, the CPU 201 for each service references setting information that is set via the screen of FIG. 6 and stored in the RAM 202 and confirms whether or not it is possible to use the respective service in direct wireless communication. Then, the processing proceeds to step S704, the CPU 201 confirms the port number required in the service that is set so as to be able to be used in direct wireless communication, sets so that wireless communication is possible by only the ports of these port numbers, and ends the processing.

By this, the printing apparatus 100 can make it so that it is not possible to perform communication for a service other than those for which it has been permitted when performing direct wireless communication.

By the second embodiment, as described above, the user sets the services that can be used in direct wireless communication, and enables port number filter setting in direct wireless communication. By this, it is possible to exclude direct wireless communication via a port of a port number other than those used in the services that can be used.

[Third Embodiment]

Next, explanation will be given for a third embodiment of the present invention. In the third embodiment, an example of port number filter setting in direct wireless communication in the printing apparatus 100 is described. Note that since the system configuration and the configurations of the printing apparatus 100, the PC terminal 110, and the mobile terminal 120 according to the third embodiment are similar to those of the previously described first embodiment, description thereof is omitted.

Figure 8:
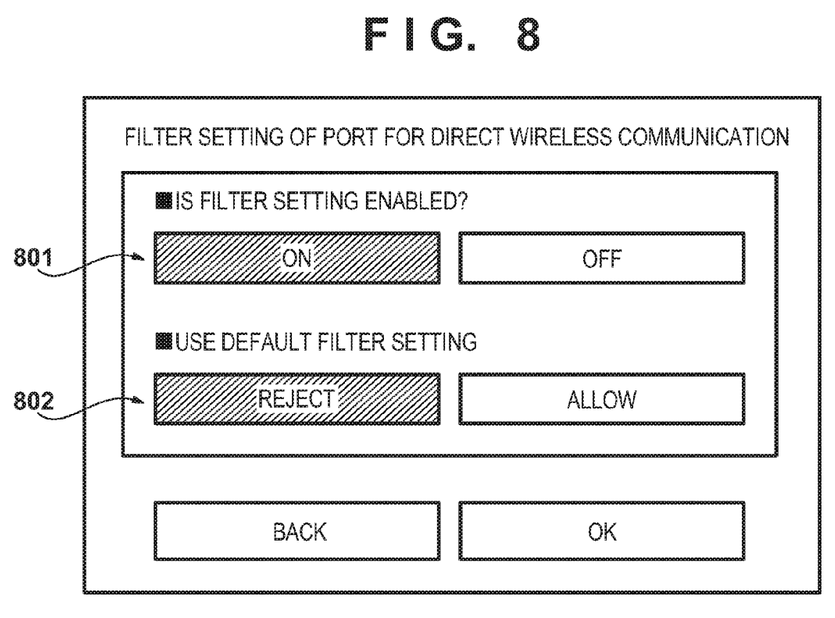
FIG. 8 depicts a view illustrating an example of a UI screen which is displayed on the console unit of the printing apparatus according to a third embodiment, and on which a filter setting of a port for direct wireless communication is performed.

FIG. 8 depicts a view illustrating an example of a UI screen which is displayed on the console unit 211 of the printing apparatus 100 according to the third embodiment, and on which a filter setting of a port for direct wireless communication is performed.

In FIG. 8, there are buttons 801 for designating whether or not to make the filter setting enabled, and buttons 802 for instructing whether or not to permit a default filter setting. Setting by the buttons 801 are the same as the ON and OFF buttons of FIG. 4 of the first embodiment previously described.

The default filter setting is stored in, for example, the ROM 203 or the HDD 204. When the ON button of the buttons 801 is selected, the port filter setting in direct wireless communication is enabled, and when the OFF button is selected, the port filter setting in direct wireless communication is disabled. Also, when "reject" of the buttons 802 is selected, the default filter setting is made to be not employed, and when "permit" of the buttons 802 is selected, the default filter setting is employed.

When the ON button in the buttons 801 is selected, it can be selected whether to make the later described port filter list to be a permission list or a rejection list. Also, for example, wireless communication on all ports is rejected if a port number on which to permit wireless communication is registered when "reject" is selected in the buttons 802.

The above described port filter list is a setting dedicated to an interface for direct wireless communication, and does not affect communication of a wired LAN interface, for example.

Figure 9:
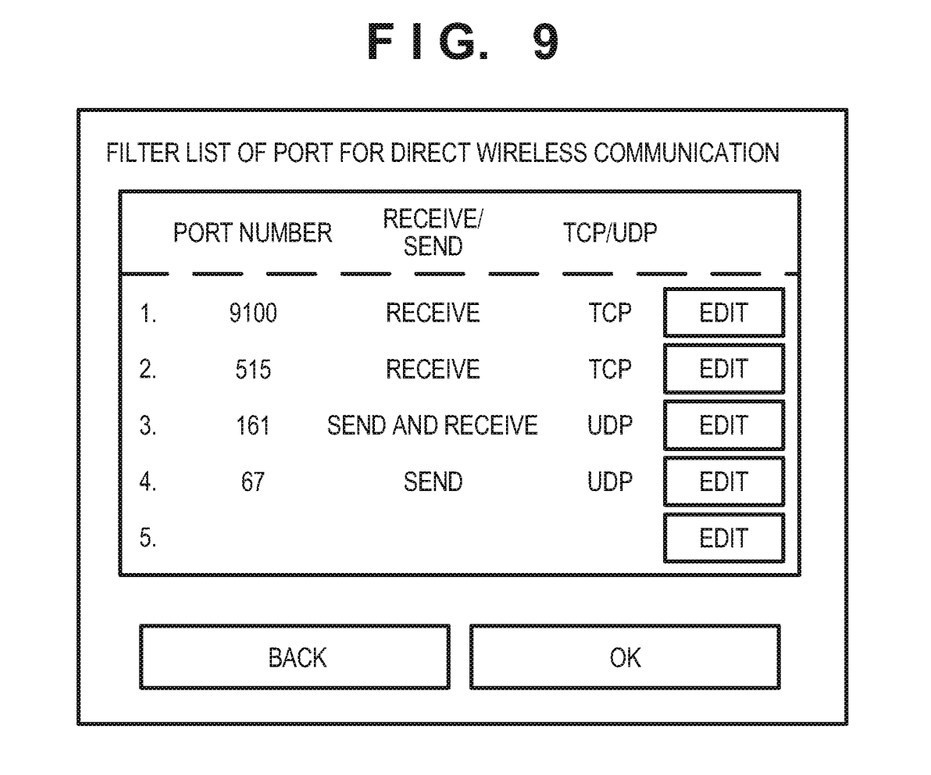
FIG. 9 depicts a view illustrating an example of a filter list screen which is displayed on the console unit of the printing apparatus according to embodiments, and on which a filter is set with respect to a port for direct wireless communication.

FIG. 9 depicts a view illustrating an example of a filter list screen which is displayed in the console unit 211 of the printing apparatus 100 according to the third embodiment, and on which a setting of a port for direct wireless communication is performed.

In the filter setting here, it is possible to make the setting designating the port number, send/receive, and TCP/UDP. The user can set the permission or rejection of send/receive with respect to a particular port number via this filter list setting screen. In FIG. 9, reception and communication in the protocol "TCP" are set to be prohibited for the port number "9100", for example. In FIG. 9, it is made to be possible to set filters with respect to five port numbers, but there may be more than this. Regarding edit buttons, when corresponding filter settings are respectively updated, the user can press the edit button and change the filter setting. Also, configuration may also be taken such that for the port number, by designating a predetermined range of port numbers such as "10-200" for example, it is possible to perform the same filter setting for a plurality of ports corresponding to those port numbers.

Figure 10:
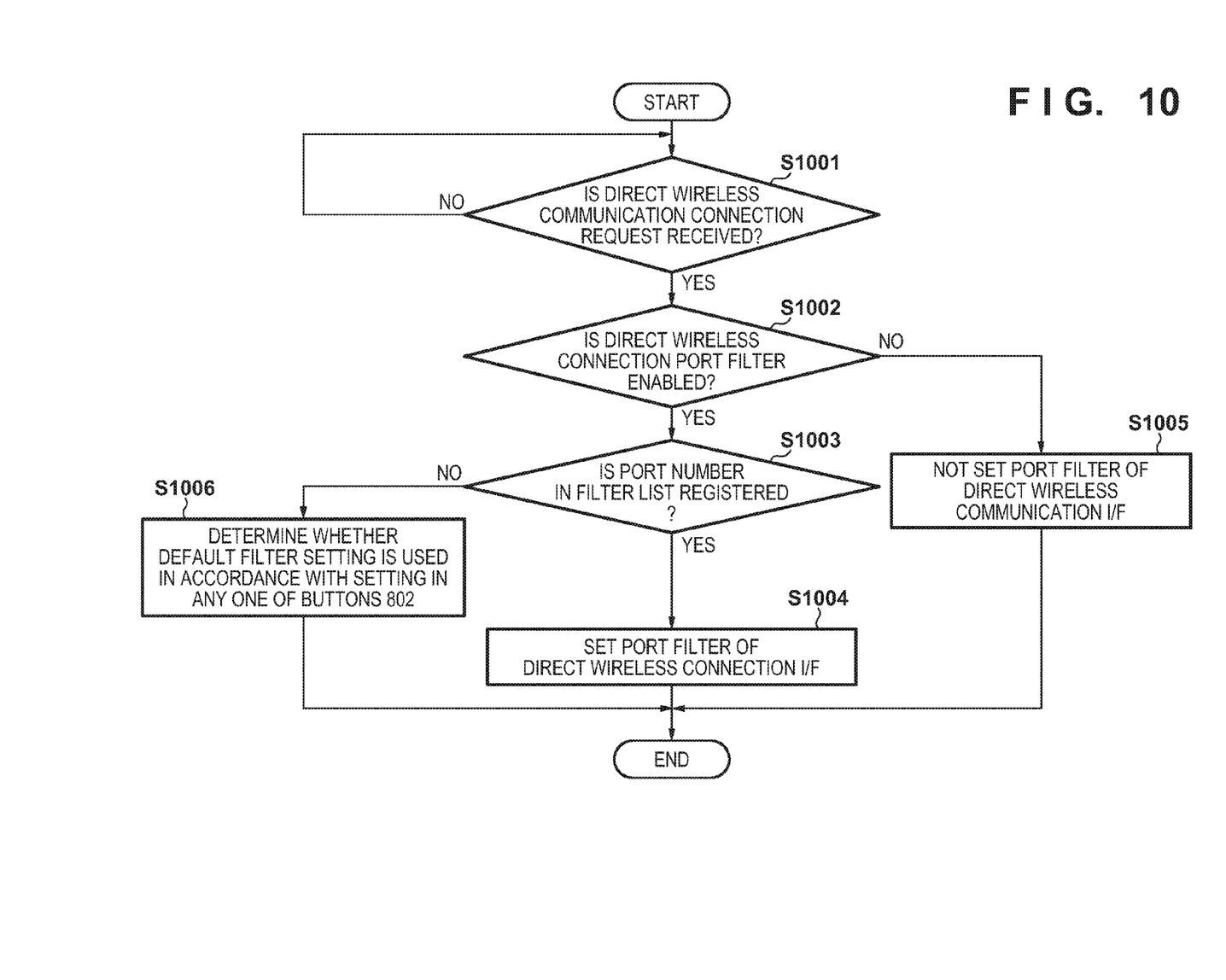
FIG. 10 is a flowchart for describing control processing when the printing apparatus according to the third embodiment performs direct wireless communication.

FIG. 10 is a flowchart for describing control processing when the printing apparatus 100 according to the third embodiment performs direct wireless communication. Also, each step described in this flowchart is realized by the CPU 201 deploying and executing a control program stored in a memory such as the ROM 203 to the RAM 202. Note that in FIG. 10, the processing of step S1001, step S1002, and step S1005 is the same as step S301, step S302, and step S304 of FIG. 3 according to the previously described first embodiment, and description thereof is omitted.

In step S1003, the CPU 201 references information stored in the RAM 202 that is set via the screen of FIG. 9 to determine whether or not a port number is set in a filter list for ports for direct wireless connection. Here, if a port number is set in the filter list, the processing proceeds to step S1004, and the CPU 201 performs port filter processing as in the setting registered in the filter list. That is, it is set so that it is possible to communicate via only ports of port numbers for which communication is permitted that are not registered in the filter list, and the processing ends. Meanwhile, when, in step S1003, the CPU 201 determines that there is no information registered in the filter list, the processing proceeds to step S1006, port filtering processing is performed in accordance with the setting as to whether or not to permit the default filter setting which is set by any one of the buttons 802 of FIG. 8, and the processing ends.

By this, the printing apparatus 100 can be made to not be able to communicate via a port other than one of a permitted port number when send/receive of data is performed via the direct wireless connection interface.

By virtue of the third embodiment, as described above, when it is instructed that filter setting is made to be enabled for a port number used in direct wireless communication, it is possible to select whether or not to use the default filter setting when a filter setting has not been performed. By this, it is possible to perform direct wireless communication using a port of only permitted port numbers if the filter setting is enabled and the filter setting has not be performed.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-019251, filed Feb. 3, 2016, which is hereby incorporated by reference herein in its entirety.

What is claimed is:

1. A printing apparatus equipped with a direct wireless communication function, the apparatus comprising:
at least one processor; and
at least one memory having instructions stored thereon which, when executed by the at least one processor, cause the printing apparatus to:
set, in accordance with an instruction of a user, a service to be enabled in the direct wireless communication function from among a plurality of services including a print service; and
control the printing apparatus to execute the direct wireless communication function, applying a port filter corresponding to the set service,
wherein the port filter does not affect communication of a wired LAN interface.

2. The printing apparatus according to claim 1, wherein the at least one processor further executes instructions stored on the memory to cause the printing apparatus to set, in accordance with an instruction of a user, whether or not to apply the port filter to the direct wireless communication function,
wherein if the port filter is set to be applied to the direct wireless communication function, the processor controls the printing apparatus to execute the direct wireless communication function, applying the port filter corresponding to the set service.

3. The printing apparatus according to claim 1, wherein the plurality of services includes at least one of the print service, a scan service, a send service, and a discovery service.

4. A printing apparatus, comprising:
at least one processor; and
at least one memory having instructions stored thereon which, when executed by the at least one processor, cause the printing apparatus to:
perform direct wireless communication with an external apparatus;
set whether or not to enable a port filter in the direct wireless communication; and
control to perform the direct wireless communication in accordance with the port filter set for a port used in a direct wireless communication function in a case that the port filter is set to be enabled.

5. A method of controlling a printing apparatus equipped with a direct wireless communication function, the method comprising:
setting, using at least one processor, in accordance with an instruction of a user, a service to be enabled in the direct wireless communication function from among a plurality of services including a print service; and
controlling, using the at least one processor, the printing apparatus to execute the direct wireless communication function, applying a port filter corresponding to the service that is set,
wherein the port filter does not affect communication of a wired LAN interface.

6. A method of controlling a printing apparatus equipped with a direct wireless communication function, the method comprising:
setting, using at least one processor, whether or not to enable a port filter in a direct wireless communication; and
controlling, using the at least one processor, to perform the direct wireless communication in accordance with the port filter, which is set for a port used in the direct wireless communication function, when the port filter is set to be enabled.

7. A non-transitory computer-readable storage medium storing a program for causing a processor to execute a method of controlling a printing apparatus equipped with a direct wireless communication function, the method comprising:

setting, in accordance with an instruction of a user, a service to be enabled in the direct wireless communication function from among a plurality of services including a print service; and     controlling the printing apparatus to execute the direct wireless communication function, applying a port filter corresponding to the service that is set,     wherein the port filter does not affect communication of a wired LAN interface.

8. A non-transitory computer-readable storage medium storing a program for causing a processor to execute a method of controlling a printing apparatus equipped with a direct wireless communication function, the method comprising:

setting whether or not to enable a port filter in a direct wireless communication; and     controlling to perform the direct wireless communication in accordance with the port filter, which is set for a port used in the direct wireless communication function, when the port filter is set to be enabled.

\* \* \* \* \*